April 14, 1925.
C. L. SHINE
CYLINDER BEARING FOR COUPLERS
Filed Sept. 28, 1923
1,533,472
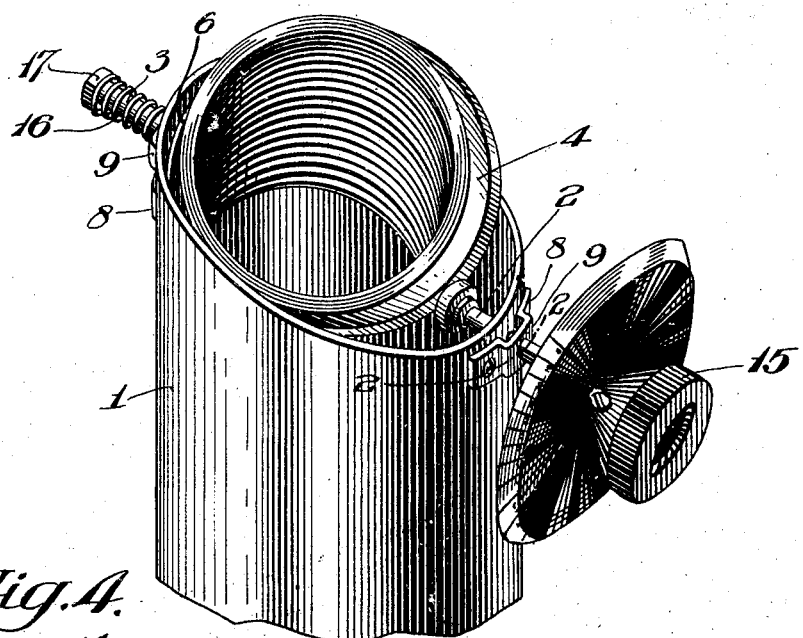
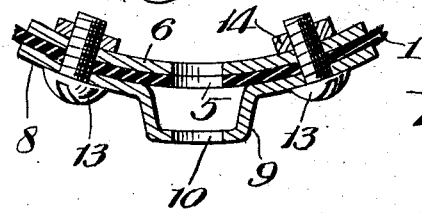
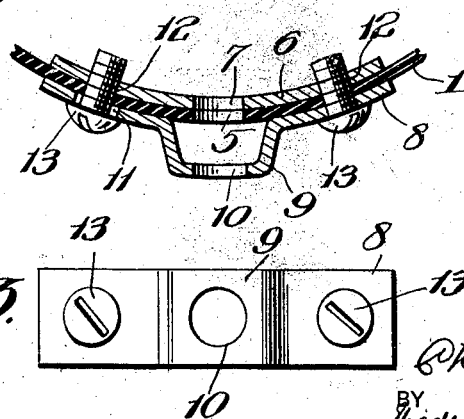
INVENTOR:
Charles L. Shine.
BY
ATTORNEYS.

Patented Apr. 14, 1925.

1,533,472

UNITED STATES PATENT OFFICE.

CHARLES L. SHINE, OF PHILADELPHIA, PENNSYLVANIA.

CYLINDER BEARING FOR COUPLERS.

Application filed September 28, 1923. Serial No. 665,509.

*To all whom it may concern:*

Be it known that I, CHARLES L. SHINE, a citizen of the United States, residing in the city and county of Philadelphia, State of Pennsylvania, have invented new and useful Cylinder Bearings for Couplers, of which the following is a specification.

In certain types of radio apparatus, couplers of various characters are rotatably mounted within an insulating cylinder, which is frequently cheaply made of pasteboard or the like, and I have found it necessary to re-inforce the bearings for the coupler shafts which pass diametrically through an end of said cylinder, in the novel manner to be hereinafter described.

My invention relates to a novel construction of cylinder bearings for coupler shafts of the general character aforesaid wherein inner and outer bearing members or bars are provided, having holes therein, which align with the diametrically opposed holes in the non-conducting cylinder, means being provided whereby the bearing members are quickly assembled and secured in assembled position with respect to the coupler cylinder, so that diametrically opposite portions thereof are re-inforced, and in addition durable and properly aligned bearings are provided for the coupler shafts.

To the above ends my invention consists of a novel construction of cylinder bearings for couplers and the like, all as will be hereinafter fully set forth in the specification and claims appended hereto.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of cylinder bearings for couplers, embodying my invention, showing also the supporting cylinder, coupler and their adjuncts. Figure 2 represents on an enlarged scale, a section on the line 2—2 of Figure 1. Figure 3 represents a side elevation of Figure 2. Figure 4 represents a construction somewhat similar to Figure 2 but showing nuts employed as a fastening means for the screws.

Similar numerals of reference indicate corresponding parts.

Referring to the drawings:

1 designates a non-conducting cylinder for radio apparatus, in the upper portion of which is mounted the shafts 2 and 3 of a coupler 4 of any desired standard or conventional type. As these cylinders are usually cheaply made of pasteboard or similar material, it is desirable to re-inforce the diametrically opposed perforations 5 therein, through which said shafts pass, so that permanent, durable and effective bearings for said shafts may be provided, which I effect in the following manner. I position on the inner surface of the cylinder 1 a curved bar 6, having the hole 7 therein in alignment with the hole 5 through the cylinder, and in alignment therewith, I position the outer curved bar or bearing member 8, having the outwardly bowed portion 9, with the hole 10 therethrough, said holes 10, 5, and 9 being in alignment, when the bearing members are assembled.

The outer bar 8 has holes 11 therethrough, which align with the tapped holes 12 in the inner bar 6, so that when the screws 13 are in position, as seen in Figure 2, both the outer and inner curved bearing bars are rigidly secured with respect to the cylinder and a rigid, durable and permanent bearing is provided for the coupler shafts, and in addition the upper diametrically opposite portions of the cylinder 1 are re-inforced, and horizontally aligned accurately positioned bearings are provided for the coupler shafts 2 and 3, so that the latter can be readily rotated without binding into the desired position by the knob 15. The screws 13 can be threaded into the inner bar 6, as seen in Figure 2, or if desired nuts 14 can be employed on said screws, as seen in Figure 4. The spring 16 interposed between the left hand bearing member 8, and the nut 17, provides the requisite friction to hold the coupler and its adjuncts in the desired adjusted position.

It will be evident that by reason of the provision of the bowed or offset portion 9, the elongated bearings for the couplers are provided which is desirable in this class of apparatus.

It will now be apparent that I have devised a novel and useful cylinder bearing for couplers which embodies the features of advantage enumerated as desirable in the statement of the invention and the above description, and while I have, in the present instance shown and described a preferred embodiment thereof which will give in practice satisfactory and reliable results, it is to be understood that such embodiment is susceptible of modification in various particulars without departing from the spirit or scope of the invention or sacrificing any of its advantages.

I claim:

1. A journal mounting for coupler shafts, comprising in combination with the coupler and its support, an apertured bar to engage the inner face of the coupler support, an outer bar to engage the outer face of said coupler support, and fastening devices passing through one bar and the coupler support and engaging the other bar, said outer bar having an outwardly deflected apertured portion, and said inner bar having an aperture aligning with the aperture of the outer bar, said apertures being adapted to receive the coupler shafts.

2. A journal mounting for coupler shafts, comprising in combination with the coupler and its support, an apertured bar to engage the inner face of the coupler support, an outer bar to engage the outer face of said coupler support, fastening devices passing through one bar and the coupler support and engaging the other bar, said outer bar having an outwardly deflected apertured portion, and said inner bar having an aperture aligning with the aperture of the outer bar, said apertures being adapted to receive a coupler shaft, and a tension device mounted on one of said shafts and having one of its ends bearing on said outwardly deflected apertured portion and its other end on a nut carried by the shaft carrying said tension device.

CHARLES L. SHINE.

Witnesses:
E. HAYWARD FAIRBANKS,
N. BUSSINGER.